United States Patent [19]
Takahashi

[11] Patent Number: 6,101,270
[45] Date of Patent: Aug. 8, 2000

[54] NEURAL NETWORK ARCHITECTURE FOR RECOGNITION OF UPRIGHT AND ROTATED CHARACTERS

[75] Inventor: Hiroyasu Takahashi, San Jose, Calif.

[73] Assignee: International Business Machines Corporation, Armonk, N.Y.

[21] Appl. No.: 08/569,064

[22] Filed: Nov. 7, 1995

Related U.S. Application Data

[63] Continuation of application No. 08/260,495, Jun. 15, 1994, abandoned, which is a continuation of application No. 07/938,925, Aug. 31, 1992, abandoned.

[51] Int. Cl.$^7$ ..................................................... G06T 1/40
[52] U.S. Cl. ........................................... 382/158; 382/216
[58] Field of Search ..................................... 382/155, 158, 382/156, 187, 209, 216, 217, 220, 296, 157

[56] References Cited

U.S. PATENT DOCUMENTS

| | | | |
|---|---|---|---|
| 3,636,513 | 1/1972 | Tisdale | 340/146.3 |
| 3,638,188 | 1/1972 | Pincoffs et al. | 340/146.3 |
| 4,933,872 | 6/1990 | Vandenberg et al. | 364/513 |
| 4,941,122 | 7/1990 | Weideman | 364/807 |
| 4,947,449 | 8/1990 | Peppers et al. | 382/65 |
| 4,958,939 | 9/1990 | Samad | 382/35 |
| 5,048,097 | 9/1991 | Gaborski et al. | 382/14 |
| 5,048,100 | 9/1991 | Kuperstein | 382/36 |
| 5,052,043 | 9/1991 | Gaborski | 382/14 |
| 5,054,094 | 10/1991 | Barski | 382/23 |
| 5,058,180 | 10/1991 | Khan | 382/14 |
| 5,060,278 | 10/1991 | Fukumizu | 382/14 |
| 5,063,605 | 11/1991 | Samad | 382/44 |
| 5,067,164 | 11/1991 | Denker et al. | 382/15 |
| 5,075,871 | 12/1991 | Weidman | 395/24 |
| 5,086,479 | 2/1992 | Takenaga et al. | 382/14 |
| 5,093,867 | 3/1992 | Hori et al. | 382/14 |
| 5,119,438 | 6/1992 | Ueda et al. | 382/14 |

FOREIGN PATENT DOCUMENTS

| | | | |
|---|---|---|---|
| 0 464 327A2 | 1/1992 | European Pat. Off. | G06F 15/80 |
| 635798 | 2/1988 | Japan . | |
| 2-33687 | 2/1990 | Japan . | |
| 02240790 | 9/1990 | Japan . | |
| 02240791 | 9/1990 | Japan . | |
| 3237574 | 1/1992 | Japan | G06F 15/70 |
| WO 91/17518 | 11/1991 | WIPO | G06K 9/36 |

OTHER PUBLICATIONS

Reed, K.A., "A Translation/Rotation Invariant Neural Network Trained via Conjugate Gradient Optimization," IEEE Conference on Systems Engineering, Aug. 1989.

(List continued on next page.)

*Primary Examiner*—Amelia Au
*Assistant Examiner*—Larry J. Prikockis
*Attorney, Agent, or Firm*—Gray Cary Ware Freidenrich

[57] ABSTRACT

A neural network architecture is provided for optical character recognition from an input image in which the target character may be rotated in the image plane. The architecture includes hidden units whose inputs receive image information from portions of the image which are rotationally distributed. That is, the local link between input units and the hidden units is adequate for rotation of the character in the image. Therefore, regardless of the orientation of the image, it is right side up, or approximately so, with respect to one of the hidden units. The hidden units have corresponding inputs with corresponding weight factors, i.e., symmetric weight sharing. Thus, regardless of the orientation of the image, one of the hidden units will produce a high output value indicative of an upright character. Alternatively, a single hidden unit has groups of inputs, each group having a corresponding set of weight factors. The groups are coupled to input units for rotationally distributed portions of the image. Therefore, for any orientation of the image corresponding with one of the groups of inputs of the hidden unit, the hidden unit produces the same output value. In an preferred embodiment, feature information such as local contour direction information is provided to the input units. The feature information is provided with respect to slices of the image taken in different directions.

24 Claims, 10 Drawing Sheets

OTHER PUBLICATIONS

H. Takahashi, A Simple Recognition Method for Hadwritten Kanji Characters by Using Primitive Connection Directions of Thinking, IBM Japan Ltd.

E. Persoon, K. S. Fu, Shape Discrimination Using Fourier Descriptors, IEEE Transaction Sys., Man, and Cybernetic, vol. SMC–7, No. 3, Mar. 1977, pp. 170–179.

S. W. Lee, H. S. Park and Y. Y. Tang, Translation–,Scale–, and Rotation–invariant Recogntion of Hangul Characters with Transformation Ring Projection, Dept. of Computer Sci. Chungbuk Nat. Univ., Republic of Korea, pp. 829–836.

Y. N. Hsu, H. H. Arsenault and G. April, Rotation–invariant Digital pattern Recognition Using Circular Harmonic Expansion, Applied Optics, vol. 21, No. 22, pp. 4012–4015, Nov. 15, 1982.

N. K. Hu, Visual Pattern Recognition by Moment Invariants, IRE Transactions on Information Theory, pp. 179–187, 1962.

A. Taza and C. Y. Suen, Discrimination of Planar Shapes Using Shape Matrices, IEEE Transaction on Sys., Man. & Cybernetics, vol. 19., No. 5, pp. 1281–1289, Sep./Oct. 1989.

Takahashi, Neural Network Architectures for Rotated Character Recognition, IBM RJ 8459 (76467), Nov. 1, 1991.

S. D. You, G. E. Ford, Connectionish Model for Object Recognition, APIE vol. 1709 Applications of Artificial Neural Networks III (1992), pp. 200–207.

R. Duran, B. Peikari, A New Neural Network Architecture for Rotationally Invariant Object Recognition, IEEE Proceddings of the 34th Midwest Symposium on Circuits and Systems Cat. No. 91CH3143–5, vol. 1, pp. 320–323, May 17, 1991.

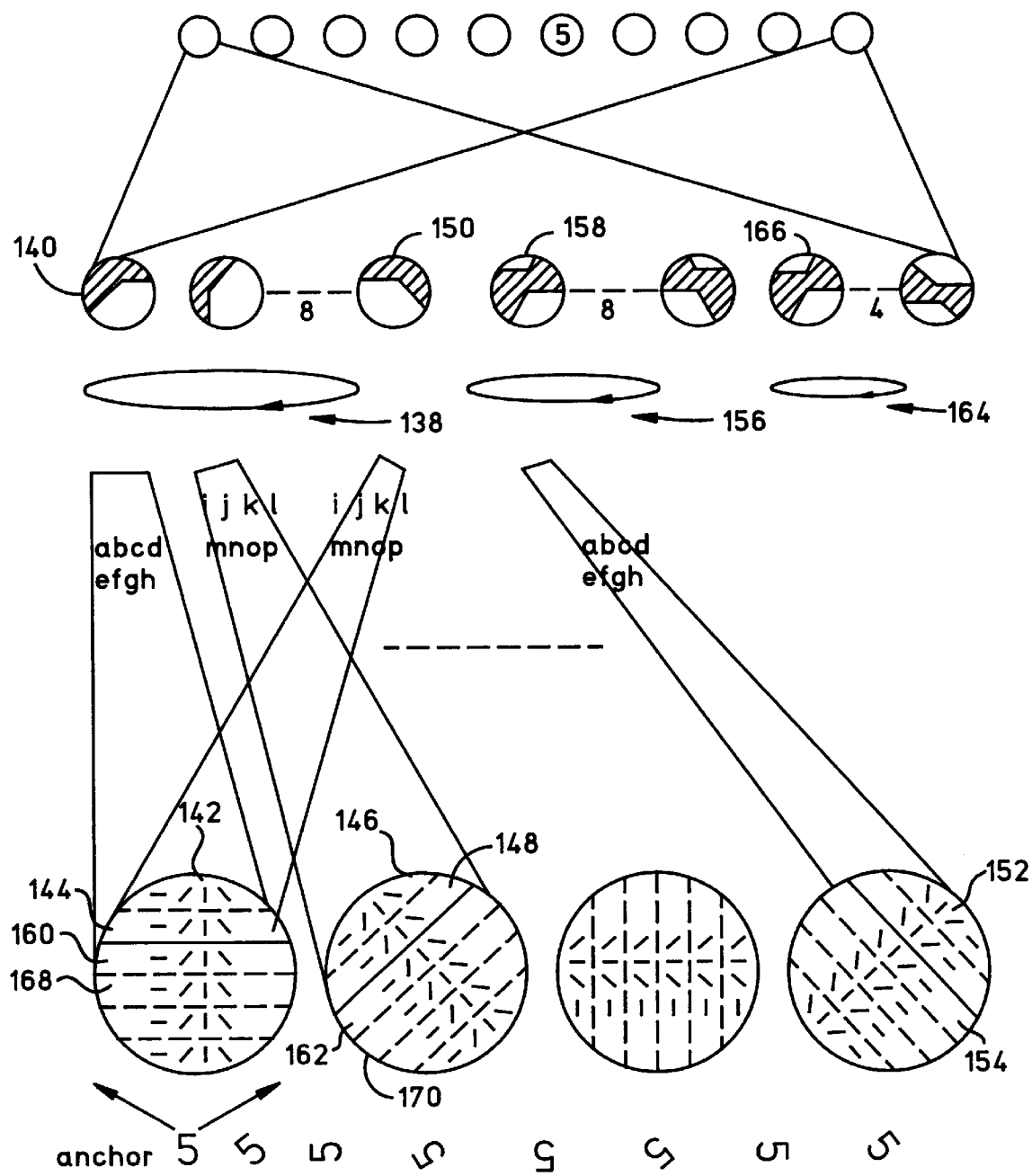

NEURAL NETWORK ARCHITECTURE FOR RECOGNITION OF UPRIGHT AND ROTATED CHARACTERS

This is a continuation of application Ser. No. 08/260,495 filed on Jun. 15, 1994, now abandoned, which is a continuation of application Ser. No. 07/938,925 filed on Aug. 31, 1992, now abandoned.

FIELD OF THE INVENTION

The invention is generally related to the field of pattern recognition. More specifically, the invention is related to neural network optical character recognition.

BACKGROUND OF THE INVENTION

In recent years, a great deal of effort has been devoted to developing pattern recognition technology. In particular, optical character recognition (OCR) technology has potentially wide applicability in the fields of banking and handwriting analysis. A given character can be printed or written with a variety of different stroke widths, relative proportions, loop sizes, etc. Also, a character may be smeared, copied faintly, or otherwise distorted. In addition, a character may not be in anchor orientation, i.e., may not be right side up, in the image plane. Rather, the orientation of a character in the image plane may vary. OCR technology must be able to cope with these differences, distortions, and rotations, while being able to recognize characters from a known character set with a high degree of accuracy and reliability.

Neural network technology has been employed for optical character recognition applications. A good introduction to neural network architecture and its application to OCR is given in U.S. Pat. No. 5,052,043, issued to Gaborski and titled "Neural Network with Back Propagation Controlled Through an Output Confidence Measure". A brief overview will be provided here.

A neural network may be either implemented in hardware, or simulated using a digital computer. In either case, a neural network is made of one or more units. FIG. 1 is a schematic diagram of a typical unit of a neural network. The unit includes one or more inputs 2, each input having a weight factor (w1, w2, etc.). The weight factors may be implemented as amplifiers 4 having amplification factors corresponding to the weight factors. The neural network unit also includes a summing circuit 6 which receives and adds the weighted input signals, and produces an output 8 related to the sum of the input signals.

Analogies may be drawn between the structure of the unit shown in FIG. 1 and a biological nerve cell. The inputs 2 are analogous to nerve synapses or dendrites, and the summing circuit 6 and the output 8, taken together, are analogous to a neuron. Sometimes the tern "neuron", is used to refer to a neural network unit in its entirety, as shown in FIG. 1. In the present description of the invention, the term "unit", will be used.

The output 8 is shown as a graph, which represents the output signal as a function of the sum of the weighted inputs. The output signal is sometimes referred to as an activation function or activation. The output signal has a value related to the sum of weighted inputs and to a threshold value. For instance, the output could be a high value if the sum exceeds the threshold, or a low value if the sum does not exceed the threshold. Alternatively, to avoid a sharp discontinuity, the output could be "smoothed" by employing an hyperbolic tangent or sigmoid function. That is, in the vicinity of the threshold, the output has an S shape, increasing as the sum approaches and exceeds the threshold. Farther below the threshold, the output asymptotically approaches the low value, and farther above the threshold, the output asymptotically approaches the high value.

A conventional neural network architecture, shown in FIG. 2, employs three layers of neural network units, referred to respectively as a layer of input units 10, a layer of hidden units 12, and a layer of output units 14. This neural network architecture has been used in optical character recognition (OCR) applications as follows. An input image to be recognized as one of a set of known characters is represented as a rectangular array of pixels, each pixel having a brightness value. The input units 10, making up the input layer of the neural network, are equal in number to the number of pixels. Each input unit has one weighted input, coupled to receive an input signal from a respective pixel. The input signal is related to the brightness of the pixel.

Each hidden unit 12 has a plurality of weighted inputs, coupled to the outputs of respective ones of the input units 10. The number of hidden units 12, the number of inputs per hidden unit 12, and the which particular input units 10 are coupled to the respective hidden units 12, are all factors to be determined by the network designer, based on criteria such as the degree of variation between foreseeable images of a given character to be recognized.

Each output unit 14 also has a plurality of weighted inputs, coupled to outputs of various subsets of the hidden units 12. The number of output units 14 is equal to the number of different characters the network is to recognize. For instance, a network for recognizing the digits 0 through 9 would have ten output units, which respectively correspond to the ten digits to be recognized.

The output of each of the output units 14 is an analog value which ranges between the low and high values shown in the output 8 of FIG. 1. For a given input image, each output unit 14 will produce an output signal value. If one of the output units provides an output signal noticeably higher than that of the other output units 14, then the network is said to have recognized the input image as being the character corresponding to the output unit producing the high signal.

It will be seen that the neural network architecture just described is a general purpose architecture, useful in a wide variety of applications, such as recognition of a wide variety of character sets or images. A given neural network recognizes a given character set by virtue of the particular weight values set for the inputs to the various units in the three layers. The weight values are set during a "training" phase of operation of the network.

Training is an empirical process in which various known reference images are applied to the inputs of the input units, and the signal values at the output units are observed. A given input image is known to represent a given one of the characters to be recognized. The weight values are adjusted to increase the output signal for the output unit corresponding to the given character, and to decrease the output signals for the other output units. This adjustment of weight values based on observed output values is called back propagation.

Back propagation is performed for many different images representing each of the characters to be recognized. This training process generally requires a large number of iterations, including repetitions of previously employed images after the weight factors have been adjusted from back propagation with other images.

Eventually, weight values for all the inputs of the input, hidden, and output units are found which provide satisfactory recognition of all the input images used in the training. These weight values enable the neural network to recognize images of the desired characters which are within a desired degree of deviation from the images used in training.

However, if the references images used in the training as described above only show upright characters, then the network may be unable to recognize images of rotated characters. This inability is a drawback which would limit the usefulness of neural network OCR systems. On the other hand, if rotated character images are used for training, the duration and difficulty of the training phase are greatly increased.

Conventional systems have attempted to overcome the problem of recognizing rotated images of characters by employing a polar arrangement for receiving the input image. For instance, in Lee et al, "Translation-, Scale-, and Rotation-invariant Recognition of Hangul Characters with Transformation Ring Projection", International Conference on Document Analysis and Recognition ICDAR-91, pp. 829–836, there is described an OCR scheme in which a polar coordinate system is superimposed on an image to be recognized, and a histogram of black pixels is created as a function of radial distance from the center of the image. However, this scheme is not satisfactory for many OCR applications, particularly with regard to recognizing handwritten characters. Different individuals may write a given character using pen strokes varying distances apart. Accordingly, for a given character, corresponding strokes written by different people might be tangent to two different concentric circles of the polar coordinate system. A substantial difference in histogram values would result, leading to a high likelihood of erroneous character recognition.

Another conventional OCR scheme for recognizing rotated characters is described in Taza, et al, "Discrimination of Planar Shapes Using Shape Matrices", IEEE Transactions on Systems, Man, and Cybernetics, Vol. 19, No. 5, September/October 1989, pp. 1281–9. A polar coordinate system is superimposed on an image to, be recognized, and a shape matrix, defined in terms of radius and rotational angle, indicates whether corresponding elements of the image are white or black. Thus, the greater the radial value, i.e., the farther away a given element of the image is from the center of the polar coordinate system, the larger the area of the image element. On the other hand, the image elements near the center of the image are small. As a consequence, a slight variation near the center of the image, caused by foreseeable variations in handwriting or printing fonts, will likely cause a substantial variation in the values produced in the shape matrix. Accordingly, this conventional arrangement also has a high likelihood of erroneous character recognition.

Persoon et al, "Shape Discrimination Using Fourier Descriptor", IEEE Transactions on Systems, Man, and Cybernetics, Vol. SMC-7, No. 3, March 1977, pp. 170–9, discloses a method for recognizing boundary curves or shapes. Fourier descriptors describing closed curves having no discontinuities may be defined (equation 2). A suitable starting point on a closed curve is selected, and a distance between an unknown sample and a nearest sample in a training set is calculated for curve matching. However, this method has the disadvantage that some of the details of the image to be recognized, such as inner loops, are lost in the course of obtaining the Fourier descriptors. As a consequence, this method also provides an undesirably high recognition error rate.

Hu, "Visual Pattern Recognition by Moment Invariants", IRE Transactions on Information Theory, February 1962, pp. 179–87, discloses a method for determining moments of a density distribution function. An image of a character to be recognized is characterized as a density distribution function, and moments are calculated therefrom. The image is recognized as one of a set of characters by comparing the calculated moments with known moments for the character set. Methods are described for achieving orientation independence. However, this method also provides an undesirably high recognition error rate. Additionally, the method requires a great deal of complicated and time consuming calculations.

In summary, conventional arrangements for recognizing images of rotated characters have not been able to recognize characters, particularly rotated characters, with a desirably high rate of accuracy.

SUMMARY OF THE INVENTION

It is therefore an object of the invention to provide a method and apparatus for optical character recognition which provide high character recognition accuracy for character images in which the character is rotated, i.e., not right side up, in the image plane.

It is an additional object of the invention to provide a neural network architecture which facilitates accurate recognition of character images, even if the character is rotated, i.e., not right side up, in the image plane.

It is a further object of the invention to provide a neural network architecture for recognition of rotated characters which recognizes both a character and the orientation of the character in the image plane.

It is a further object of the invention to provide a neural network architecture for recognition of rotated characters which is trainable by only anchor oriented characters, i.e., characters which are right side up.

In order to solve the above-described drawbacks of conventional character recognition methods and systems and to achieve the above and other objects, there is provided in accordance with the invention a neural network architecture for recognition of rotated characters. The architecture includes a neural network unit layer having a plurality of groups of weighted inputs for receiving signals related to respective image elements of an image to be recognized, the respective image elements being distributed at respective positions relative to the image, the weighted inputs of the groups having corresponding weight values.

The neural network architecture according to the invention preferably includes three layers, including an input layer, a hidden layer, and an output layer, the hidden layer including the above-mentioned neural network layer. The input layer includes a plurality of input units, each input unit having an input for receiving image element information from one of the image elements. The output layer includes a number of output units equal to the number of characters the neural network architecture is to recognize. When a valid character is recognized, the corresponding output unit produces a high output value, and the other output units produce low output values.

According to a further aspect of the invention, the hidden layer includes a plurality of hidden units having corresponding weighted inputs with equal weight factors. The hidden unit weighted inputs are coupled to respective ones of the input units for receiving signals related to image information from image elements which are distributed at respective positions relative to the image. A switching mechanism is provided between the input and hidden layers, to switchably couple respective ones of the signals to the hidden unit inputs. Various switch states of the switching mechanism correspond with various rotational orientations of the character, and compensate for the orientations. All Zero training is used to set weight factors such that, for the switch setting that compensates for the rotational orientation of the character image, the output unit corresponding with the character produces a high value. For other switch settings, all of the output units produce low values.

According to a further aspect of the invention, the hidden layer includes at least one hidden unit having a plurality of groups of inputs, corresponding inputs in each group having equal weight factors. The groups of inputs are coupled to respective ones of the input units for receiving image information from image elements which are distributed at respective positions relative to the image.

As a consequence, an image which is provided to the neural network causes the neural network to produce corresponding overall output values if the image is aligned with any of the image elements at the respective positions. The image is thus recognized accurately, even if it is rotated.

In another aspect of the invention, the output layer includes an additional output unit, other than the output units which respectively correspond with the characters to be recognized. This additional output unit produces a high value if the input image is not recognized as any of the characters the neural network is to recognize. Thus, the additional output unit could be designated as "others".

In a preferred embodiment of the invention, the image element information received by the input units is feature information, such as local contour direction information. The feature information is determined, for each image element, as a count of occurrences of at least one feature. The architecture includes means for dividing each respective image element into unit cells, and means for counting the number of unit cells in which the at least one feature occurs. The input layer includes an input unit for each feature for each image element.

Experimental results have shown that a neural network OCR system according to the invention achieves advantageously high character recognition rates. Also, the accuracy of recognition of characters is high even for rotated characters. If a sufficiently large number of groups of inputs to the hidden layer are provided, corresponding with image elements distributed over a large enough number of positions on the image, then an image is accurately recognized regardless of its orientation.

BRIEF DESCRIPTION OF THE DRAWINGS

FIG. 7A is an illustration of All-Zero training.

FIG. 7B is a schematic diagram of a neural network optical character recognition system employing the input information method of FIG. 6.

DESCRIPTION OF THE PREFERRED EMBODIMENTS

Several aspects of a neural network architecture according to the invention lead to the desired high character recognition rate. Each of the aspects will be discussed and illustrated separately.

Note, initially, that the invention is described primarily in terms of a three-layer (input, hidden, output) neural network architecture, which is commonly employed in most neural networks today. Noteworthy aspects of the invention, recited in the appended claims, are illustrated as being in the hidden layer. However, other neural network architectures would be foreseeable to a person skilled in the art, which would not necessarily have the same three layers (input, hidden, output). Thus, the noteworthy aspects of the invention, described below, would not necessarily be within the exemplary hidden layer. Nevertheless, the spirit and scope of the invention covers other neural network architectures which, in light of the present specification, would be recognized by a person skilled in the art as being capable of including or implementing the above aspects of the invention.

Local Link Adequate for Rotation Between Input and Hidden Units (LLR)

The first aspect of the invention to be discussed is called LLR. LLR stands for "Local Link adequate for Rotation between input and hidden units".

Figure 3:
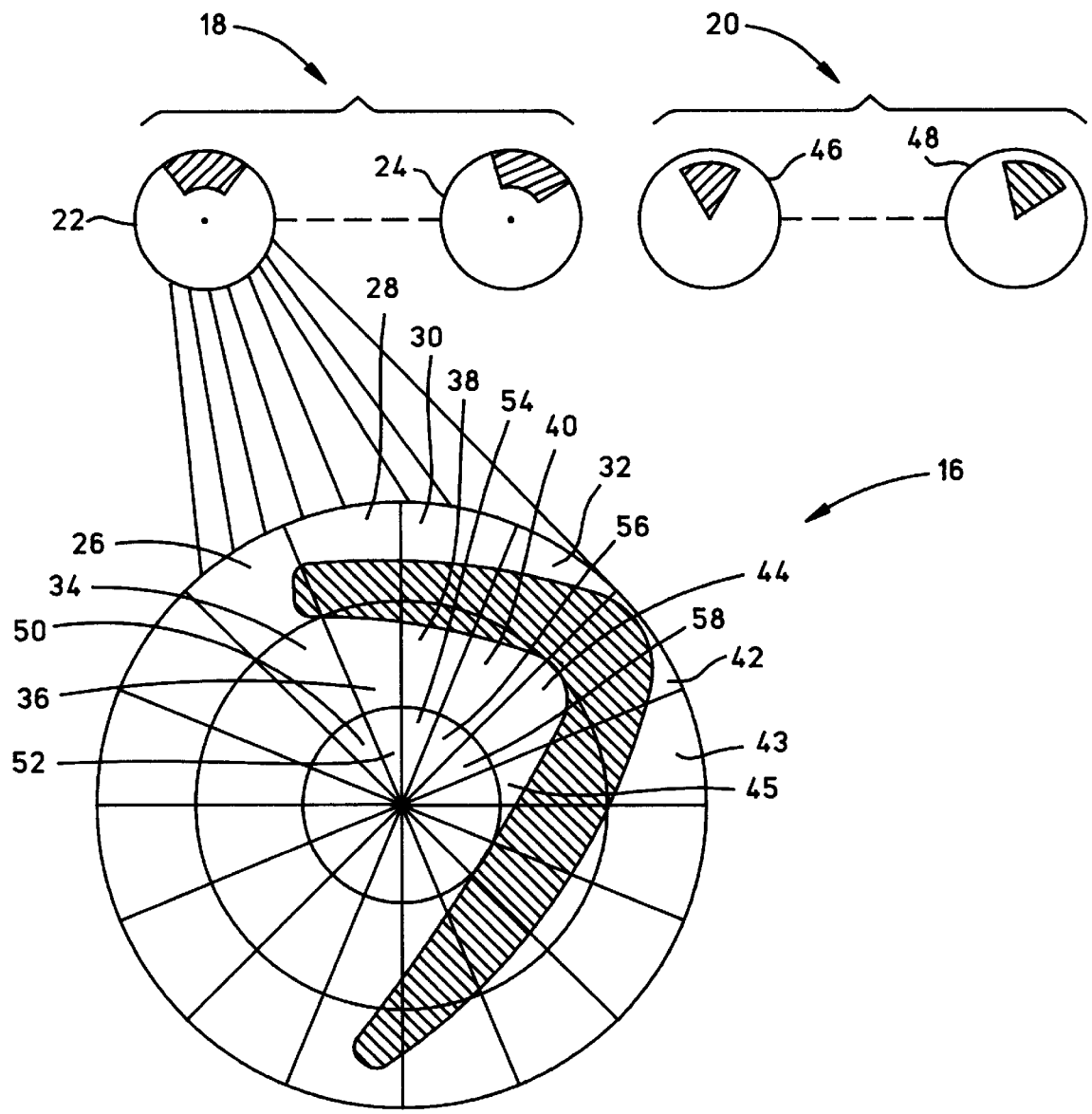
FIG. 3 is a schematic diagram of the input and hidden layers of a neural network according to a first aspect of the invention.

FIG. 3 is a schematic representation which illustrates the LLR property in connection with the input layer and the hidden layer of a three-layer neural network architecture. A layer of input units 16 is represented as an image of a character to be recognized. For the purpose of the present illustration, a polar coordinate system is superimposed over the image. However, the polar system is not essential to the invention. A preferred mode for practicing the invention, which does not employ a polar system, will be described below.

The polar system includes sixteen radii and three concentric circles to divide the image into forty-eight image elements. The neural network employs an input layer including forty-eight input units, one for each of the image elements. For the purpose of this illustration, the image and the polar system which divides the image into image elements are shown as representing the input units.

The input units 16 receive image information from their respective image elements. The exact nature of this image information may vary. For example, the image information could be a count of the number of black pixels in the respective image element.

As is the case with known three-layer neural networks, the input units 16 each have an output, and their outputs are coupled to inputs of hidden units, which make up the hidden layer of the network. In accordance with this aspect of the invention, one or more groups of the hidden units have inputs coupled to outputs of respective input units which receive image information from image elements that are distributed at rotational angles relative to the image.

Two such groups of hidden units, 18, and 20, are shown. Each hidden unit is represented schematically as a shaded portion of the image, corresponding with respective input units 16. Each shaded portion represents a group of the image elements whose input units 16 are coupled to inputs of one hidden unit. For instance, two hidden units 22 and 24 are shown in the group 18.

As shown in FIG. 3, the image is divided by sixteen (16) radii, and by concentric circles, into sections in the fashion of a polar coordinate system, each section providing input data to an input unit. Each successive hidden unit of the group 18, of hidden units has as inputs a group of input units displaced one additional radius around the image. Since there are sixteen radii, the group 18 includes sixteen hidden units. The same is true for the group 20.

The hidden unit 22 is shown as a shaded portion corresponding with image elements 26, 28, 30, 32, 34, 36, 38, and 40 of the image. Thus, this schematic representation indicates that the hidden unit 22 has eight inputs coupled to eight input units, and the eight input units receive image information from the image elements 26, 28, 30, 32, 34, 36, 38, and 40.

Similarly, the hidden unit 24 has eight inputs. However, the shaded portion of the hidden unit 24 is rotated slightly clockwise, compared to that of the hidden unit 22. This rotation represents that the eight inputs of the hidden unit 24 are coupled to eight input units which receive image information from the image elements 28, 30, 32, 36, 38, and 40, and also from image elements 42 and 44. Thus, there is overlap between the hidden units 22 and 24, but the hidden unit 24 is rotated one radius clockwise with respect to the hidden unit 22.

Mapping of Hidden Unit Weighted Inputs to Input Unit Image Elements

For simplicity, only two hidden units are shown explicitly in FIG. 3. However, the dotted lines between the hidden units 22 and 24 indicate that there are actually sixteen hidden units in the group 18. These sixteen hidden units are coupled to respective input units 16 which go around the image, each successive hidden unit 22 and 24 being one radius further clockwise that the previous one.

The group 20 of hidden units also includes 16 hidden units. These hidden units are also distributed around the image, each successive hidden unit being one radius further clockwise. For instance, two hidden units 46 and 48, of the group 20 are shown. The hidden unit 46 is coupled to eight input units which receive image information from the image elements 34, 36, 38, and 40, and also from image elements 50, 52, 54, and 56. The hidden unit 48, is coupled to eight input units which receive image information from the image elements 36, 38, 40, 44, 52, 54, and 56, and also from an image element 58. Therefore, the hidden unit 48, is rotated by one radius clockwise with respect to the hidden unit 46.

FIG. 3, as described above, illustrates one example of the LLR aspect of the invention. "Local Link" refers to the link between the input and hidden layers. As shown, the respective hidden units have inputs which are coupled from input units which receive image information from respective image elements that are distributed at respective positions relative to the image. In the particular case of the polar scheme for dividing the image into image elements as shown in FIG. 3, the respective positions are at various rotational angles relative to the image. Thus, different hidden units correspond with various rotationally distributed regions of the image.

Another part of the LLR aspect of the invention will now be described, with regard to FIG. 3A. The "adequacy for Rotation" refers to the fact that respective ones of the input units are rotatably coupled to respective ones of the hidden units. This rotation is referred to as "high level" because it takes place between the input units and the hidden units, as opposed to low level rotation, which would take place between the image elements and the input units.

Figure 3A:
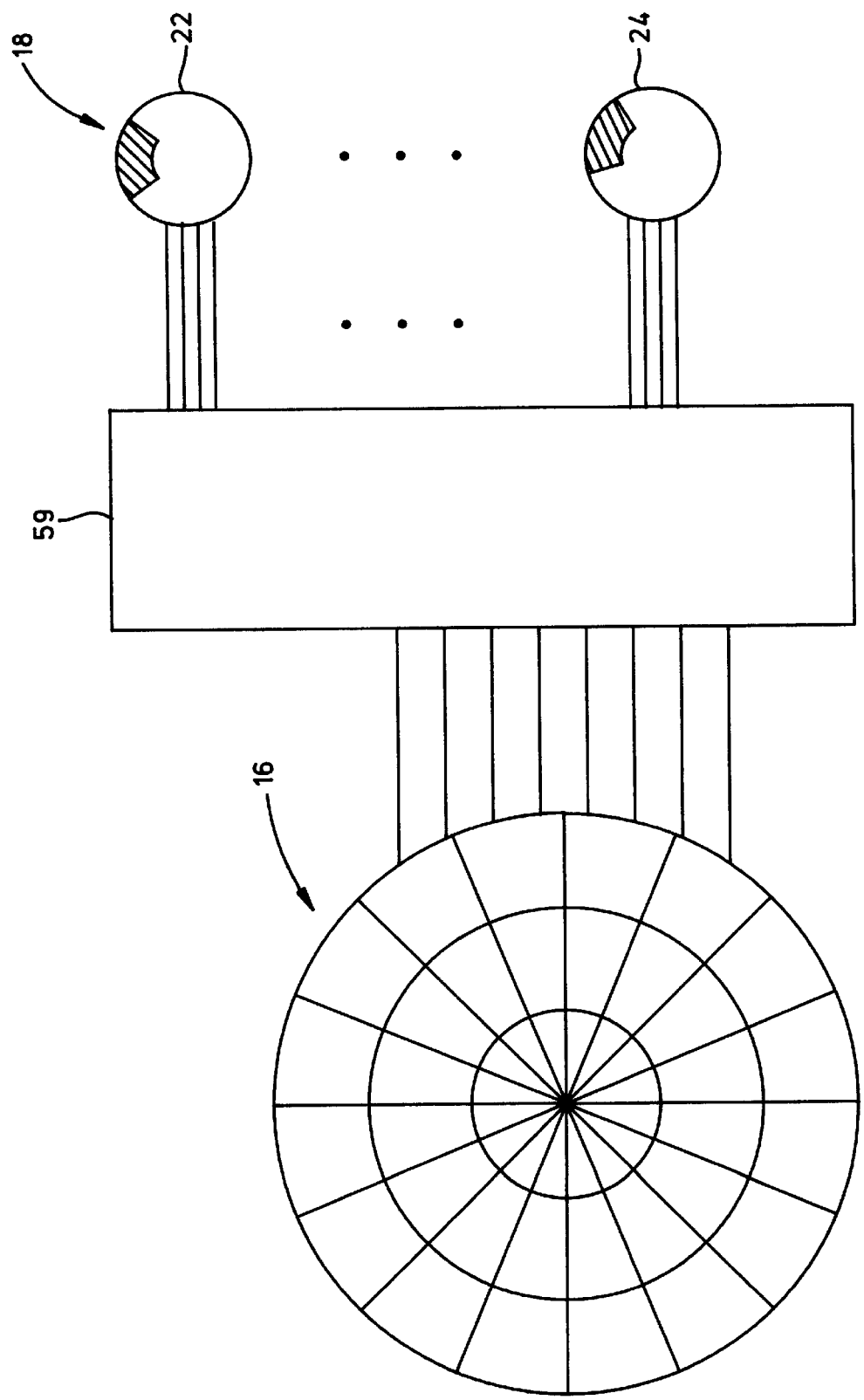
FIG. 3A is a schematic diagram of the neural network of FIG. 3, showing an additional portion of its structure.
Figure 3B:
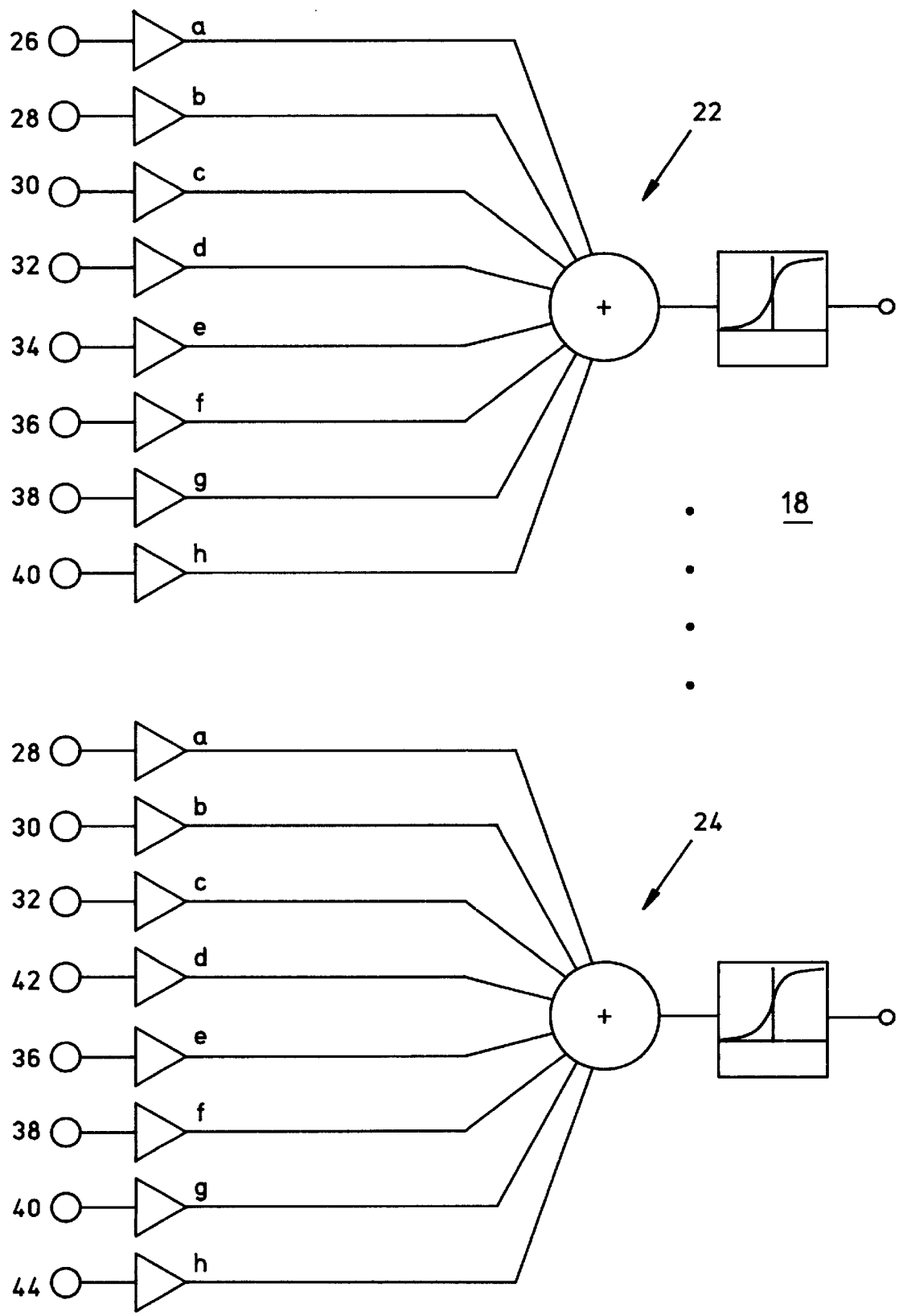
FIG. 3B is a schematic diagram of the neural network hidden units 22 and 24 of FIG. 3.

FIG. 3A shows a mechanism for achieving this high level rotation. The input units 16 are schematically represented as the image elements, as in FIG. 3. Also, the group 18, of hidden units is shown. It will be understood that the other hidden units are also present. However, a switching mechanism 59 is additionally shown. The switching mechanism 59 is coupled between the outputs of the input units and the inputs of the hidden units. The switching mechanism 59 provides connections between the input units and the hidden units. For illustrative purposes, a portion of the switching capability of the switching mechanism 59 is shown in TABLE 1.

TABLE 1

MAPPING OF INPUT UNITS TO HIDDEN UNITS AS SHOWN IN FIG. 3, USING THE 16-STATE SWITCH 59 OF FIG. 3A

| SWITCH STATE | INPUT UNITS | HIDDEN UNIT |
|---|---|---|
| 1 | 26,28,30,32, 34,36,38,40 | 22 |
|   | 28,30,32,42, 36,38,40,44 etc. | 24 |
| 2 | 28,30,32,42, 36,38,40,44 | 22 |
|   | 30,32,42,43, 38,40,44,45 etc. | 24 |
| 3 | 30,32,42,43, 38,40,44,45 etc. | 22 |

The switching mechanism 59 has a number of switch states equal to the number of positions the shaded areas of the hidden units of the group 18, can occupy. In the case of the polar system of the input units 16, there are sixteen such positions. However, for brevity, only three of the switch states are shown in TABLE 1. Also, the switching mechanism 59 provides connections to all of the hidden units, i.e., all sixteen hidden units in each of the groups 18, and 20. However, for brevity, only the connections to the hidden units 22 and 24 are shown in TABLE 1. From the discussion which follows, it will be understood how the additional connections to the remaining hidden units are made in each of the sixteen switch states.

TABLE 1 refers to the input units by the numbers they are given in FIG. 3. Switch state 1 in TABLE 1 corresponds with the state previously described with regard to FIG. 3. Switch state 2 corresponds to a 22.5° rotation of the high level link between the input units 16 and the hidden units 18, and 20. Thus, the input units 28, 30, 32, 42, 36, 38, 40, and 44, which had been coupled to the hidden unit 24 in switch state 1, are now coupled to the hidden unit 22. Likewise, the input units 30, 32, 42, 38, 40, and 44, and also input units 43 and 45, are now coupled to the hidden unit 24. In similar fashion, in switch state 3, which corresponds to an additional 22.5° rotation, the input units 30, 32, 42, 43, 38, 40, 44, and 45 are coupled to the hidden unit 22.

From these partial examples of the switch connections provided by the switching mechanism 59 in the first three switch states, it will be understood that each successive switch state corresponds with an additional 22.5° high level rotation, and that each hidden unit of the groups 18, and 20 is coupled to respective ones of the input units at respective rotational positions for each switch state.

While a switching mechanism 59 is shown, it will also be understood that, in a computer simulation of a neural network, the switch states described above could be implemented in software. Thus, means for switching the high level connections could be either a hardware switching mechanism, as shown, or suitable computer software.

Training is performed on the neural network of FIGS. 3 and 3A by providing known character images at various orientations. Utilizing the rotation as described above, it is possible to match the image to an anchor orientation, i.e., right side up. High level rotation using the switching mechanism 59 is thus equivalent to rotating the input image itself. Training is performed in conjunction with the switching mechanism 59, so that the image is recognized as an anchor-oriented character, and the character's orientation is determined by the switch state of the switching mechanism 59.

Alternative embodiments of the invention which fall within the spirit and scope of the claim language will be seen. For instance, the number of hidden units may vary, providing a corresponding variation in the rotational angle between the regions of the image which are covered by respective ones of the hidden units. Also, the number of input units coupled to each hidden unit, i.e., the number of inputs per hidden unit, could be as low as 1 or as high as is desired for any particular neural network architecture, whether implemented in hardware or as a computer simulation. The portions of the image covered by the input units coupled to a given hidden unit may vary, as could the method for defining image elements. As pointed out above, the LLR aspect does not necessarily require that the input units receive image information from image elements defined through the use of a polar coordinate system.

Symmetric Weight Sharing (SWS)

A second aspect of the invention will now be described. This aspect will be referred to as SWS, which stands for Symmetric Weight Sharing.

Figure 4:
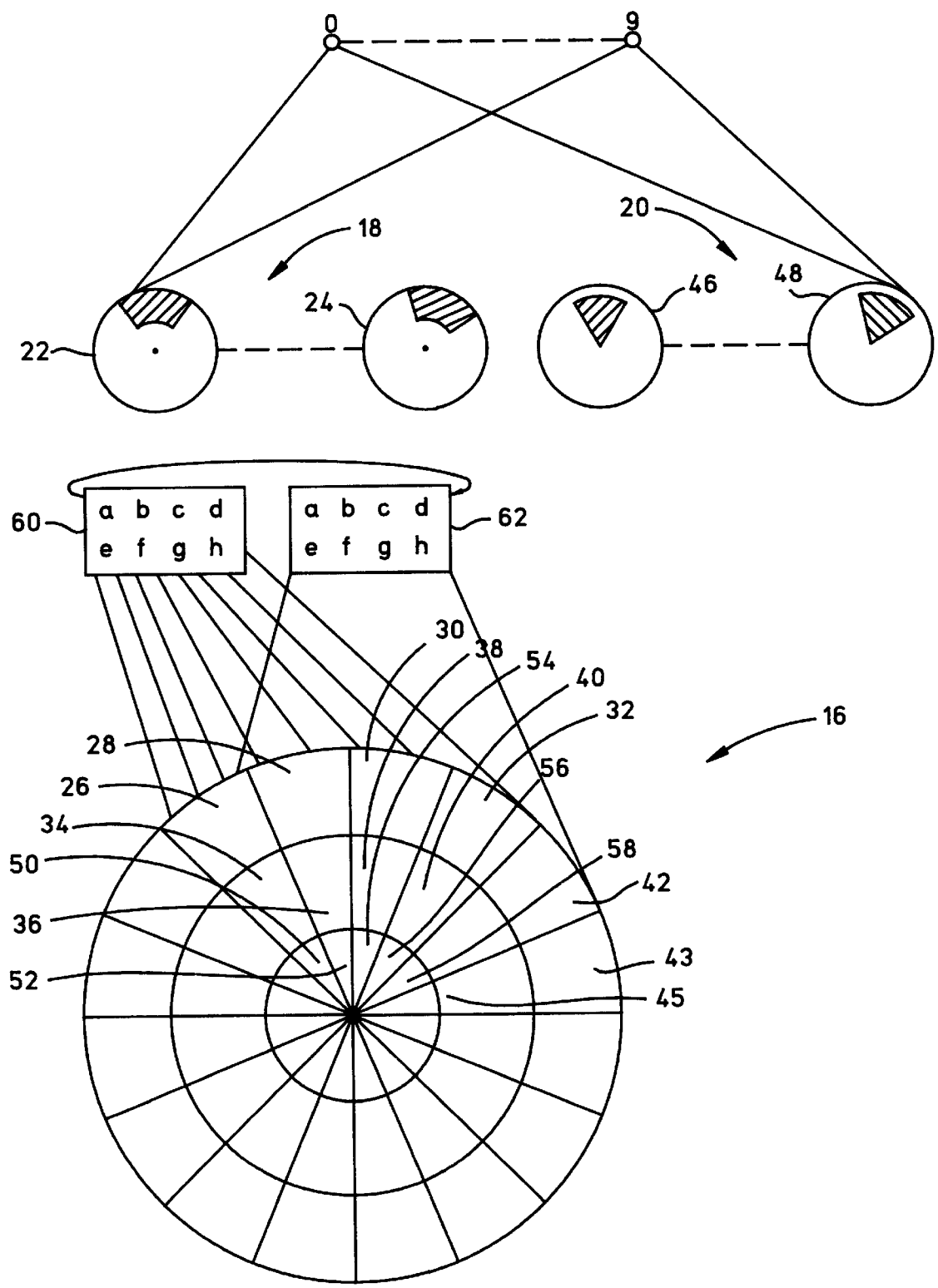
FIG. 4 is a schematic diagram of the input and hidden layers of a neural network according to another aspect of the invention.

SWS will be explained with reference to FIG. 4. FIG. 4 again shows an exemplary polar coordinate system, in which an image is divided by sixteen radii and three concentric circles into forty-eight image elements. Where applicable, elements of FIG. 4 are numbered consistently with corresponding elements of FIG. 3. The switching mechanism 59 has been omitted from FIG. 4 for simplicity, but it is understood to be present.

The hidden units 22 and 24 are additionally represented as weight factor maps 60 and 62. These weight factor maps 60 and 62 each define eight weight factors for the eight inputs of the hidden units 22 and 24, respectively. In accordance with the SWS aspect of the invention, corresponding inputs of the hidden units 22 and 24, as well as all the other hidden units making up the group 18, have corresponding weight factors.

The correspondence in input weight factors for the hidden units 22 and 24 will now be illustrated, with reference to TABLE 2. As shown, in the weight factor maps 60 and 65 each of the hidden units in the group 18, including the hidden units 22 and 24, have first through eighth inputs, which have the respective weight factors a, b, c, d, e, f, g, and h. The weight factors are represented as letters for the sake of convenience and clarity. However, it will be understood that they represent numerical values which are derived in training as described herein, or in any other suitable manner.

TABLE 2

MAPPING OF HIDDEN UNIT WEIGHTED INPUTS TO INPUT UNIT IMAGE ELEMENTS

| | HIDDEN UNIT 22 | | | HIDDEN UNIT 24 | |
|---|---|---|---|---|---|
| Input | Weight Factor | Image Element | Input | Weight Factor | Image Element |
| 1 | a | 26 | 1 | a | 28 |
| 2 | b | 28 | 2 | b | 30 |
| 3 | c | 30 | 3 | c | 32 |
| 4 | d | 32 | 4 | d | 42 |
| 5 | e | 34 | 5 | e | 36 |
| 6 | f | 36 | 6 | f | 38 |
| 7 | g | 38 | 7 | g | 40 |
| 8 | h | 40 | 8 | h | 44 |

For each hidden unit, these eight inputs are mapped from adjacent image elements in the outer and intermediate portions of the polar coordinate system which defines the image elements received by the input units. Thus, the first through fourth inputs of the hidden unit 22 receive input signals from the input units coupled to the image elements 26, 28, 30, and 32, and weight them according to weight factors a, b, c, and d. The first through fourth inputs of the hidden unit 24 use the same weight factors, but apply them to input signals from the input units coupled to the image elements 28, 30, 32, and 42.

It will be similarly seen that the fifth through eighth inputs of the input units 22 and 24 receive and weight the input unit signals from the image elements 34, 36, 38, and 40, or from 36, 38, 40, and 44, in a similarly corresponding manner. The remaining fourteen hidden units of the group 18, go around the image, receiving signals from input units coupled to respective rotationally distributed image elements, and weighting the signals using the same weight factors.

The SWS aspect of the invention is advantageously used in conjunction with high-level rotation in the LLR aspect. In the training phase, the accuracy of the output values of the output units depend on the relative weight factors of the inputs of the output units and the hidden units. Because each corresponding group of hidden unit inputs has corresponding weight factors, high level rotation does not adversely affect training. Rather, in the training phase, a technique called All-Zero training is employed. All-Zero training is illustrated in FIG. 7A. In the training phase, the weight factors are set such that, for an image having a known orientation, the output unit corresponding to the character in the image produces a high value when the high level rotation compensates for the rotation of the image character, so that it is in anchor orientation. For all other switch states, weight factors are set such that all of the output units corresponding with the known characters produce low values. In an additional preferred embodiment of the invention, an additional "others" output unit is provided, which provides a high value when the image is not recognized as any of the known characters. When an "others" output unit is provided, then All-Zero training causes the "others" output unit to produce a high value corresponding with switch states that do not high-level rotate the image to its anchor orientation.

In the recognition phase, for any orientation of the image character which corresponds with one of the shaded areas of a group of hidden units, such as the shaded areas of the group 18, when the switching mechanism 59 is set to a switch state which compensates for the rotation of the character image, image information from a given image element will be weighted by the same weight factor, regardless of which input of which hidden unit the image information is provided to. Thus, a neural network embodying the LLR and SWS aspects of the invention recognizes rotated images with a high degree of accuracy.

In summary, according to the SWS aspect of the invention, the groups of LLR hidden units have corresponding inputs with corresponding weight factors. The inputs are coupled to input units which receive image information from groups of the image elements that correspond to each other, but which are distributed around the image. Thus, as long as the orientation of the image corresponds with a distributed position of one of the groups of image elements, the image will be recognized. If the groups are distributed close enough to each other, an orientation of the image which falls between two of the groups will not seriously reduce the accuracy of recognition.

Radial Symmetric Weight Sharing (RSWS)

Figure 5:
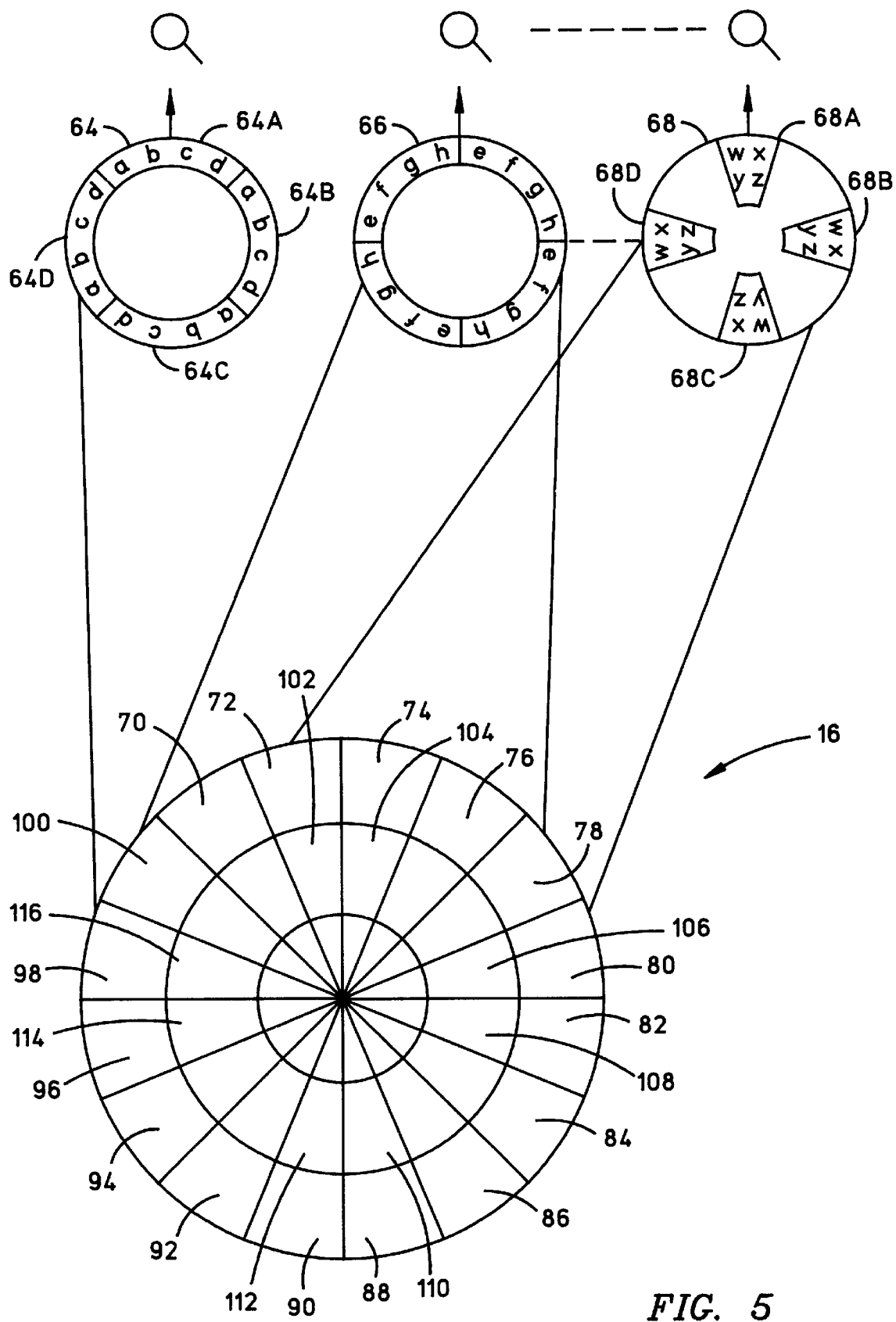
FIG. 5 is a schematic diagram of the input and hidden layers of a neural network according to another aspect of the invention.

FIG. 5 shows an additional aspect of the invention, which is related to the SWS aspect shown in FIG. 4. FIG. 5 illustrates Radial Symmetric Weight Sharing (RSWS). RSWS is different from SWS in that fewer hidden units, each having a larger number of weighted inputs, are employed, and that training with variously oriented character images is not necessary.

For illustrative purposes, the image is again subdivided into forty-eight image elements. Again, an input layer of forty-eight input units, each having one input coupled to receive image information from a respective one of the image elements, is employed. The input units are again schematically represented by the image elements.

Hidden units 64, 66, and 68, are shown. Each of the hidden units is schematically represented by a portion of the image in which weight factors are shown as letters. These weight factors represent weighted inputs to the hidden units, and identify by position the respective image elements whose input units are coupled to the hidden unit inputs. However, in accordance with the RSWS aspect of the invention, a single hidden unit has groups of inputs having corresponding weight factors. These groups of inputs are coupled to input units for image elements rotationally distributed around the image.

For instance, the hidden unit 64 has sixteen inputs, divided into four groups of four inputs. The four groups are labelled 64A, 64B, 64C, and 64D. Within each group, a first input has the weight factor a, a second input has the weight factor b, a third input has the weight factor c, and a fourth input has the weight factor d.

The inputs to the hidden unit 64 are coupled to input units for the correspondingly positioned image elements of the image 16. Thus, the first group 64A of hidden unit inputs are coupled to input units for the image elements 70, 72, 74, and 76, and apply the weights a, b, c, and d, respectively. The second group 64B of hidden unit inputs are coupled to input units for the image elements 78, 80, 82, and 84, and apply the weights a, b, c, and d, respectively. The third group 64C of hidden unit inputs are coupled to input units for the image elements 86, 88, 90, and 92, and apply the weights a, b, c, and d, respectively. The fourth group 64D of hidden unit inputs are coupled to input units for the image elements 94, 96, 98, and 100, and apply the weights a, b, c, and d, respectively.

Figure 1:
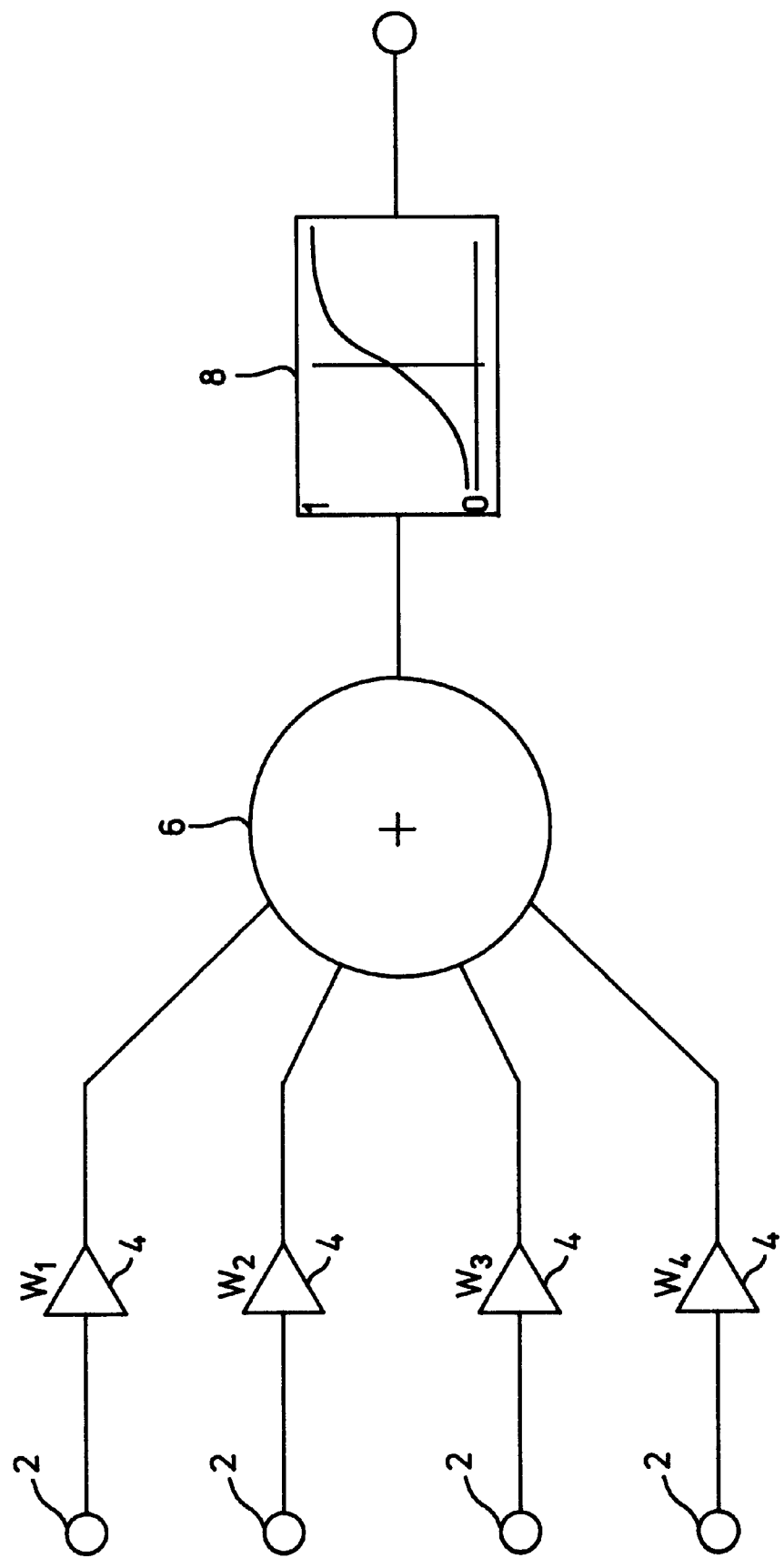
FIG. 1 is a schematic diagram of a conventional neural network unit.
Figure 2:
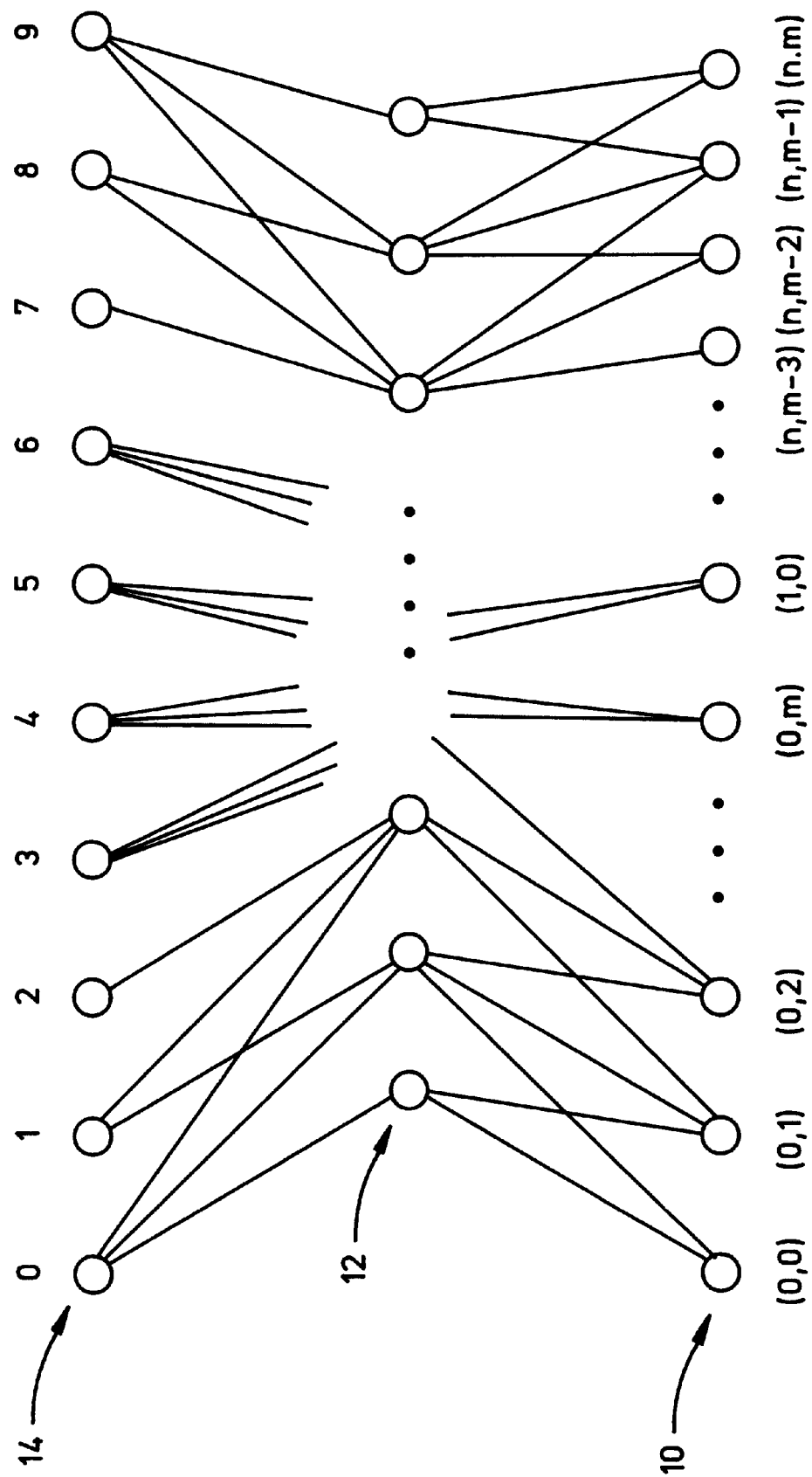
FIG. 2 is a schematic diagram of a conventional three-layer neural network architecture.
Figure 5A:
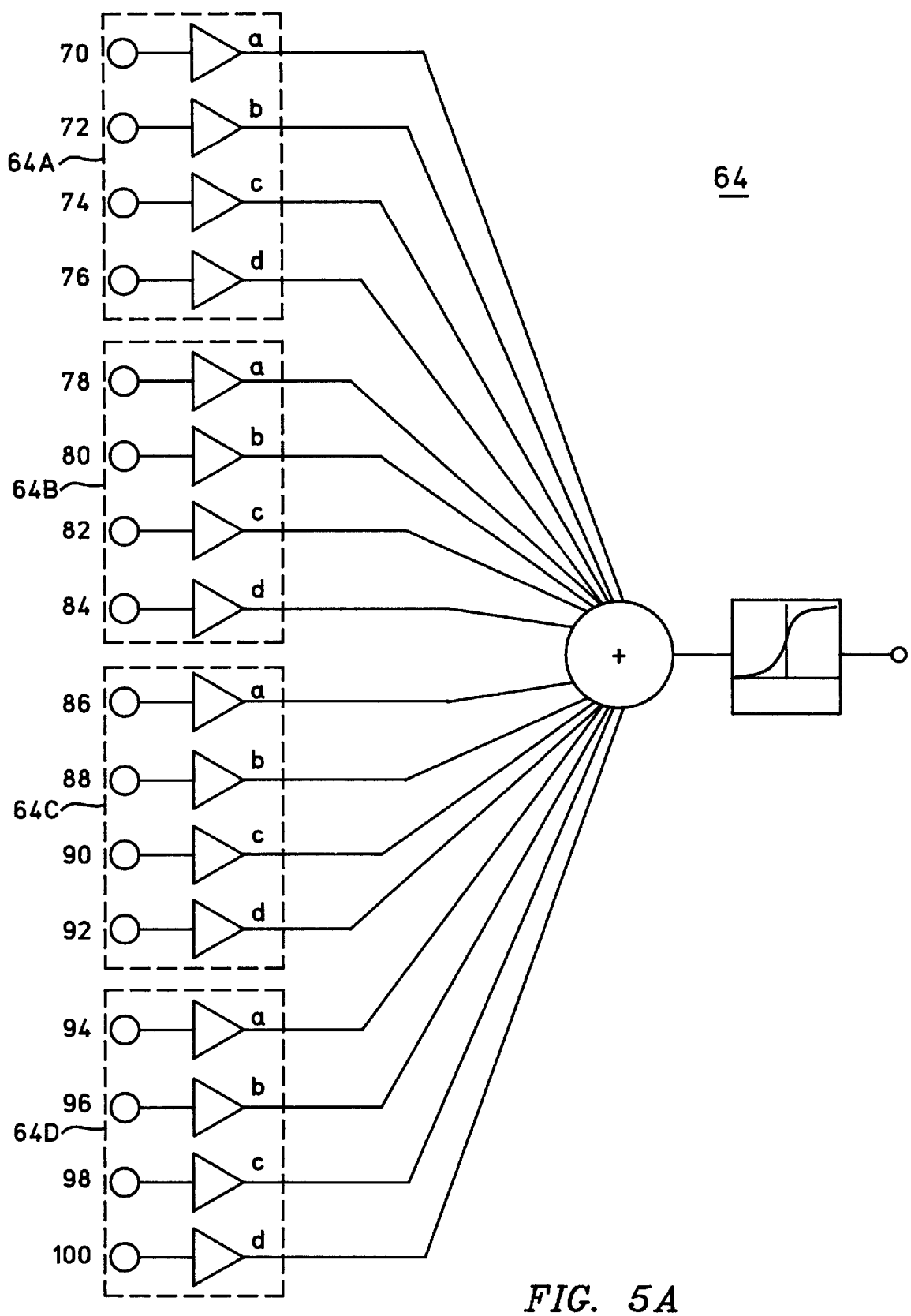
FIG. 5A is a schematic diagram of the neural network hidden unit 64 of FIG. 5.

FIG. 5A shows the hidden unit 64 of FIG. 5, in the same schematic form as that of the conventional neural network unit shown in FIG. 1. In accordance with the invention, thr four inputs of each of the four groups (64A, 64B, 64C, and 64D) of inputs of the hidden unit 64 have corresponding weight values, a through d. Also in accordance with the invention, the inputs of the hidden unit 64 are labeled with the image elements of FIG. 5, exactly as discussed above.

It will be seen that, if an image is oriented at 0°, 90°, 180°, or 270°, the output of the hidden unit 64 will have the same value. This is because in any of these four cases, corresponding image elements will be weighted with the same weight factors by the respective hidden unit inputs.

Hidden units having groups of inputs corresponding with various other ones of the image elements can be used as well. For example, the hidden unit 66 has four groups of inputs with weight factors e, f, g, and h, as shown, that are coupled to the same 16 input units for the same image elements as the hidden unit 64. However, these groups are 45° rotated with respect to the groups of inputs of the hidden unit 64.

Also, the configuration of the groups of image elements may vary. For example, the hidden unit 68, has four groups of inputs with weight factors w, x, y, and z. However, instead of being around the perimeter of the image, the inputs are coupled to input units for the image elements as shown. That is, a first group 68A of inputs of the hidden unit 68, are coupled to input units for the image elements 72, 74, 102, and 104. A second group 68B of inputs of the hidden unit 68, are coupled to input units for the image elements 80, 82, 106, and 108. A third group 68C of inputs of the hidden unit 68, are coupled to input units for the image elements 88, 90, 110, and 112. A fourth group 68D of inputs of the hidden unit 68, are coupled to input units for the image elements 96, 98, 114, and 116.

Hidden units in accordance with the RSWS aspect of the invention may also vary with regard to factors such as the number and configuration of groups of corresponding-weight inputs, the number of inputs per group, the rotational displacement of the groups with respect to each other, etc.

A neural network OCR system which embodies the LLR and SWS or RSWS aspects of the invention recognizes a given image regardless of the rotation of the image, within the limits of the rotational angle between corresponding image elements whose input units are mapped to correspondingly-weighted hidden unit inputs. In the examples discussed, the image is divided by sixteen radii, so the resolution angle is 22.5°. However, in other embodiments, this angle could vary. In particular, a neural network OCR system according to these aspects of the invention could include means for providing the image as an array of pixels, for instance in polar form, and an input unit for each pixel. Such a system would include a large number of pixels, and adjacent pixels would be displaced from each other by only a small rotational angle. Thus, the resolution angle would be much smaller than that of the illustrated examples.

A particular advantage is realized in the training phase. Since, according to the RSWS aspect of the invention, corresponding inputs of hidden units have corresponding weight values, training need only be done for images of upright oriented characters. Weight values which are determined for hidden unit inputs can then be duplicated for the inputs of all of the hidden unit inputs which cover corresponding but rotationally distributed portions of the image.

Local Contour Direction Information

There will now be discussed a preferred mode for practicing the invention, which also has been shown to provide high accuracy of OCR for images of rotated characters. This aspect of the invention may be advantageously used in conjunction with the LLR, SWS, and RSWS aspects of the invention, although it does not require that polar coordinates be used.

Figure 6:
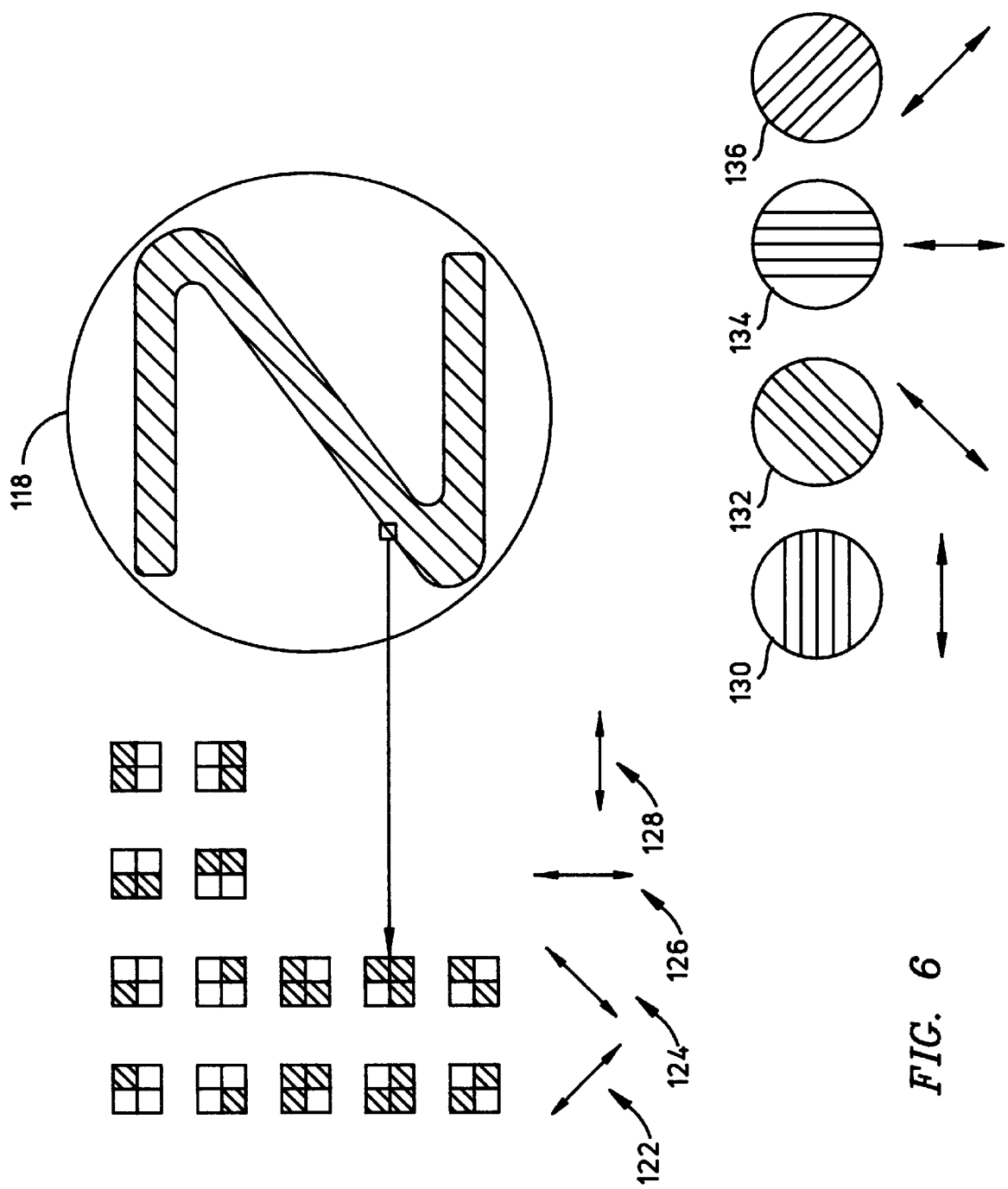
FIG. 6 is a diagram which illustrates a method for providing input information to a neural network OCR system in accordance with a preferred embodiment of the invention.

Referring to FIG. 6, there is shown an image 118, along with explanatory information relating to a method for obtaining feature information from the image 118. Feature information may be generally defined as any information which may be obtained about a portion of an image to be recognized that helps in characterizing the portion of the image. In the preferred embodiment, features relating to local contour direction are used.

To obtain local contour direction information, the image 118, or an image element, is divided into unit cells, including a unit cell 120. In the embodiment shown, each unit cell includes four pixels. Each pixel can be either white or black. There are 14 possible permutations in which at least one pixel is white and at least one is black. As shown, these permutations are classified into four categories 122, 124, 126, and 128. Within each category, the listed permutations have in common a suggestion of a local contour direction: either diagonal downward, diagonal upward, vertical, or horizontal.

A neural network OCR system in accordance with a preferred embodiment of the invention has four input units corresponding with each image element. For a given image element, each of the four input units receives a signal related to a count of the number of unit cells within the input unit which fall within a respective one of the four local contour direction categories 122, 124, 126, and 128.

A neural network OCR system can employ local contour direction information or other feature information as input information to its input units, regardless of the number of input units or the configuration of the image elements from which the input units receive input information.

However, in accordance with another preferred aspect of the invention, the image elements are defined as image slices delimited by parallel line boundaries over the image. In the illustrated embodiment, there are six slices in each of four directions 130 (horizontal), 132 (diagonal upward), 134 (vertical), and 136 (diagonal downward). For each of the six slices of each of the four directions, there are four input units for the four categories 122, 124, 126, and 128, making a total of 96 input units. It will be seen that image element slices from different directions 130, 132, 134, and 136 overlap.

FIG. 7B illustrates the SWS aspect of the invention as applied to the preferred mode of FIG. 6. Four projections of the image are shown. The four projections are divided into image elements by slicing, i.e., by providing parallel boundary lines in four directions. In the present illustration, each projection is divided into six slices. For each of the six slices which serve as image elements, there are four local contour directions. A count of the number of unit cells within each slice which have the local contour directions are provided to each of four input units. Thus, for any one projection, there are a total of twenty-four input units. For the four projections, there are a grand total of ninety-six input units.

In the illustrated embodiment, there are twenty hidden units. Each hidden unit has sixteen inputs, which are coupled to input units for the four pieces of local contour direction information for each of two of the six slices of each of two of the four directions. A first group 138, of the input units receives information from pairs of slices 45° apart, as shown. Each hidden unit of the group 138, has the weight factors a, b, c, d, e, f, g, h, i, j, k, l, m, n, o and p for its sixteen inputs.

A hidden unit 140 of the group 138, receives information from the input units of slices 142 and 144 at its first eight inputs (weighted a through h). The last eight inputs (weighted i through p) are coupled to receive information from the input units of slices 146 and 148. As a result, the hidden unit 140 receives image information from the shaded portion of the image.

A hidden unit 150 of the group 138, receives information from the input units of slices 152 and 154 at its first eight inputs (weighted a through h). The last eight inputs (weighted i through p) are coupled to receive information from the input units of slices 142 and 144. As a result, the hidden unit 150 receives image information from the shaded portion of the image.

It will be noted that the slices 142 and 144 provide image information to both of the hidden units 140 and 150. However, the respective input units for the slices 142 and 144 are coupled to non-corresponding inputs of the hidden units 140 and 150. As a consequence, the information from the input units of the slices 142 and 144 is weighted differently by the two hidden units 140 and 150.

It will also be noted that the respective shaded portions of the eight hidden units within the group 138 are rotationally distributed at 45° intervals. Thus, an input image, rotated at 45° intervals, will produce the same eight output values at the hidden units of the group 138, the same set of output values being distributed over sets or hidden units at different rotational distributions depending on the orientation of the image. Therefore, the arrangement illustrated in FIG. 7 is another example of Symmetric Weight Sharing (SWS) for recognition of rotated characters.

To illustrate All-Zero Training used with a neural network having SWS, FIG. 7A shows a set of variously oriented sample images of the character "5". The "anchor" orientation, i.e., right-side up, is indicated. In All-Zero training, a set of output unit output values corresponding with each respective orientation of the image is also shown. If, for instance, a "5" in the anchor orientation is used as the input image, then for all high level rotations corresponding with a "5" not in anchor orientation, all of the output units have low values. For the high level rotation corresponding with a "5" in the anchor orientation, the output unit corresponding with the character "5" produces a high value.

An analysis similar to that given for the group 138, of hidden units may also be made for the hidden units making up a group 156. The only difference is that different slices are used. For instance, a hidden unit 158, of the group 156 is coupled to input units for the slices 144 and 148, and also for slices 160 and 162. Also, a third group 164 of hidden units uses other slices. For instance, a hidden unit 166 is coupled to input units for the slices 160 and 162, and also for slices 168, and 170. Only four hidden units are necessary for the group 164 because, due to symmetry of the shaded portions about the center of the image, an 180° rotation of the shaded portion covers the same portion of the image.

While the preferred embodiments of the present invention have been illustrated in detail, the invention is not to be construed as being limited in spirit and scope to these preferred embodiments. Rather, the invention, as recited in the following claims, encompasses those alternative or equivalent modifications and adaptations which would be obvious to one skilled in the art, given the present disclosure.

What is claimed is:

1. A neural network architecture for optical character recognition of an image to be recognized, the neural network architecture comprising:

means for providing an array of input signals, respective ones of the input signals corresponding with respective image elements of the image to be recognized, the input signals having respective values which are related to the respective image elements of the image to be recognized, the array of input signals including a set of input signals whose corresponding image elements of the image are at various positions rotationally disposed about the image;

a neural network layer including first through k-th groups of weighted inputs, each group including first through n-th weighted inputs, the weighted inputs of each group having first through n-th weight values, such that the first input of each of the groups has the first weight factor, the second input of each of the groups has the second weight factor, and so forth for all n of the inputs of each of the groups;

wherein the inputs of the first through k-th groups are coupled to receive input signals of the set of input signals, such that each given one of the input signals of the set is coupled to inputs of a plurality of the first through k-th groups, and, for each of the plurality of the groups, different ones of the first through n-th weighted inputs are coupled to receive the given input signal;

the means for providing including a plurality of respective input units having inputs coupled to receive image element information of respective ones of the image elements, and having outputs coupled to the inputs of the first through k-th groups of inputs;

means for switchably coupling the inputs of the neural network layer to the outputs of the input units, to receive respective ones of the signals related to the respective image elements of the image to be recognized in accordance with the positions at which the respective image elements are distributed, thereby providing high level rotation of the signals to the at least one inputs; and whereby, an output of the neural network architecture, indicative of recognition of the image, is made based on an output of the neural network layer, the output of the neural network layer being a constant for a plurality of rotational orientations of the input image.

2. A neural network architecture as recited in claim 1, wherein the neural network layer is a hidden layer.

3. A neural network architecture as recited in claim 1, wherein:

the neural network layer includes a group of first through k-th hidden units, wherein:

(i) each of the first through k-th hidden units has a predetermined number n of first through n-th weighted inputs, the inputs having first through n-th weight values, such that the first input of each of the hidden units has the first weight factor, the second input of each of the hidden units has the second weight factor, and so forth for all n of the inputs of each of the hidden units;

(ii) the inputs of the first through k-th hidden units are coupled to receive input signals of the set of input signals, such that each given one of the input signals of the set is coupled to inputs of a plurality of the first through k-th hidden units, and, for each of the plurality of the hidden units, different ones of the first through n-th weighted inputs are coupled to receive the given input signal;

whereby, for a given input image provided as an input to the neural network architecture, the first through k-th hidden units produce a set of first through k-th output values; and whereby, which of the first through k-th output values is produced by which of the first through k-th hidden units is determined by a rotational orientation of the input image.

4. A neural network architecture as recited in claim 1, wherein:

the neural network layer includes a hidden unit having k groups of inputs, each of the groups including first through n-th weighted inputs, the inputs having first through n-th weight values, such that the first input of each of the groups has the first weight factor, the second input of each of the groups has the second weight factor, and so forth for all n of the inputs of each of the groups of inputs;

(ii) the inputs of the first through k-th groups are coupled to receive input signals of the set of input signals, such that each given one of the input signals of the set is coupled to inputs of a plurality of the groups, and, for each of the plurality of the groups, different ones of the first through n-th weighted inputs are coupled to receive the given input signal; and whereby, for a given input image provided as an input to the neural network architecture, the hidden unit produces an output value which is constant for different rotational orientations of the input image.

5. A neural network architecture as recited in claim 1, wherein the means for providing includes means for providing feature information from the image elements to the inputs of the neural network layer.

6. A neural network architecture as recited in claim 5, wherein the means for providing feature information includes means for providing a count for a number of occurrences of a feature within each of the respective image elements.

7. A neural network architecture as recited in claim 6, wherein the means for providing feature information includes means for dividing each respective image element into unit cells, and means for counting the number of unit cells in which the feature occurs.

8. A neural network architecture as recited in claim 7, wherein the means for dividing each respective image element includes means for dividing each respective image element into unit cells, each unit cell including a predetermined number of pixels, each pixel having an image value.

9. A neural network architecture as recited in claim 8, wherein the feature includes a directional feature determined, for each unit cell, by the respective image values of the pixels, and the means for counting unit cells includes means for recognizing, for each unit cell, whether the directional feature is determined by the image values of the pixels of the unit cell.

10. A neural network architecture as recited in claim 6, wherein the means for providing feature information includes means for providing a count for a number of occurrences, within each of the respective image elements, of a horizontal directional feature, a vertical directional feature, a diagonal upward directional feature, and a diagonal downward directional feature.

11. A neural network architecture as recited in claim 10, wherein:

the means for providing feature information includes means for dividing each respective image element into unit cells, each unit cell including a predetermined number of pixels, each pixel having an image value, the directional features being determined, for each unit cell, by the respective image values of the pixels, and the means for counting unit cells includes means for determining, for each unit cell, whether the directional feature is determined by the image values of the pixels of the unit cell.

12. A neural network architecture as recited in claim 5, wherein the means for providing feature information includes means for dividing the image into image element slices in a plurality of directions.

13. An optical character recognition system for recognition of an image to be recognized, system comprising:

a neural network architecture including:

means for providing an array of input signals, respective ones of the input signals corresponding with respective image elements of the image to be recognized, the input signals having respective values which are related to the respective image elements of the image to be recognized, the array of input signals including a set of input signals whose corresponding image elements of the image are at various positions rotationally disposed about the image;

a neural network layer including first through k-th groups of weighted inputs, each group including first through n-th weighted inputs, the weighted inputs of each group having first through n-th weight values, such that the first input of each of the groups has the first weight factor, the second input of each of the groups has the second weight factor, and so forth for all n of the inputs of each of the groups;

wherein the inputs of the first through k-th groups are coupled to receive input signals of the set of input signals, such that each given one of the input signals of the set is coupled to inputs of a plurality of the first through k-th groups, and, for each of the plurality of the groups, different ones of the first through n-th weighted inputs are coupled to receive the given input signal;

the means for providing including a plurality of respective input units having inputs coupled to receive image element information of respective ones of the image elements, and having outputs coupled to the inputs of the first through k-th groups of inputs; and means for switchably coupling the inputs of the neural network layer to the outputs of the input units, to receive respective ones of the signals related to the respective image elements of the image to be recognized in accordance with the positions at which the respective image elements are distributed, thereby providing high level rotation of the signals to the at least one inputs;

whereby, an output of the neural network architecture, indicative of recognition of the image, is made based on an output of the neural network layer, the output of the neural network layer being a constant for a plurality of rotational orientations of the input image.

14. A system as recited in claim 13, wherein the neural network layer is a hidden layer.

15. A system as recited in claim 13, wherein:

the neural network layer includes a group of first through k-th hidden units, wherein:

(i) each of the first through k-th hidden units has a predetermined number n of first through n-th weighted inputs, the inputs having first through n-th weight values, such that the first input of each of the hidden units has the first weight factor, the second input of each of the hidden units has the second weight factor, and so forth for all n of the inputs of each of the hidden units; and (ii) the inputs of the first through k-th hidden units are coupled to receive input signals of the set of input signals, such that each given one of the input signals of the set is coupled to inputs of a plurality of the first through k-th hidden units, and, for each of the plurality of the hidden units, different ones of the first through n-th weighted inputs are coupled to receive the given input signal;

whereby, for a given input image provided as an input to the neural network architecture, the first through k-th hidden units produce a set of first through k-th output values; and whereby, which of the first through k-th output values is produced by which of the first through k-th hidden units is determined by a rotational orientation of the input image.

16. A system as recited in claim 13, wherein:

the neural network layer includes a hidden unit having k groups of inputs, each of the groups including first through n-th weighted inputs, the inputs having first through n-th weight values, such that the first input of each of the groups has the first weight factor, the second input of each of the groups has the second weight factor, and so forth for all n of the inputs of each of the groups of inputs; and (ii) the inputs of the first through k-th groups are coupled to receive input signals of the set of input signals, such that each given one of the input signals of the set is coupled to inputs of a plurality of the groups, and, for each of the plurality of the groups, different ones of the first through n-th weighted inputs are coupled to receive the given input signal;

whereby, for a given input image provided as an input to the neural network architecture, the hidden unit produces an output value which is constant for different rotational orientations of the input image.

17. A system as recited in claim 13, wherein the means for providing includes means for providing feature information from the image elements to the inputs of the neural network layer.

18. A system as recited in claim 13, wherein the means for providing feature information includes means for providing a count for a number of occurrences of a feature within each of the respective image elements.

19. A system as recited in claim 18, wherein the means for providing feature information includes means for dividing each respective image element into unit cells, and means for counting the number of unit cells in which the feature occurs.

20. A system as recited in claim 19, wherein the means for dividing each respective image element includes means for dividing each respective image element into unit cells, each unit cell including a predetermined number of pixels, each pixel having an image value.

21. A system as recited in claim 20, wherein the feature includes a directional feature determined, for each unit cell, by the respective image values of the pixels, and the means for counting unit cells includes means for recognizing, for each unit cell, whether the directional feature is determined by the image values of the pixels of the unit cell.

22. A system as recited in claim 18, wherein the means for providing feature information includes means for providing a count for a number of occurrences, within each of the respective image elements, of a horizontal directional feature, a vertical directional feature, a diagonal upward directional feature, and a diagonal downward directional feature.

23. A system as recited in claim 22, wherein:
the means for providing feature information includes means for dividing each respective image element into unit cells, each unit cell including a predetermined number of pixels, each pixel having an image value, the directional features being determined, for each unit cell, by the respective image values of the pixels, and
the means for counting unit cells includes means for determining, for each unit cell, whether the directional feature is determined by the image values of the pixels of the unit cell.

24. A system as recited in claim 17, wherein the means for providing feature information includes means for dividing the image into image element slices in a plurality of directions.

* * * * *